Oct. 15, 1963  A. D. BATES ETAL  3,107,137
VARIABLE DENSITY CAMERA
Filed May 9, 1960  5 Sheets-Sheet 1

MELVIN WELLS,
ARTHUR D. BATES,
INVENTORS.

BY *Spendley & Horn*

ATTORNEYS.

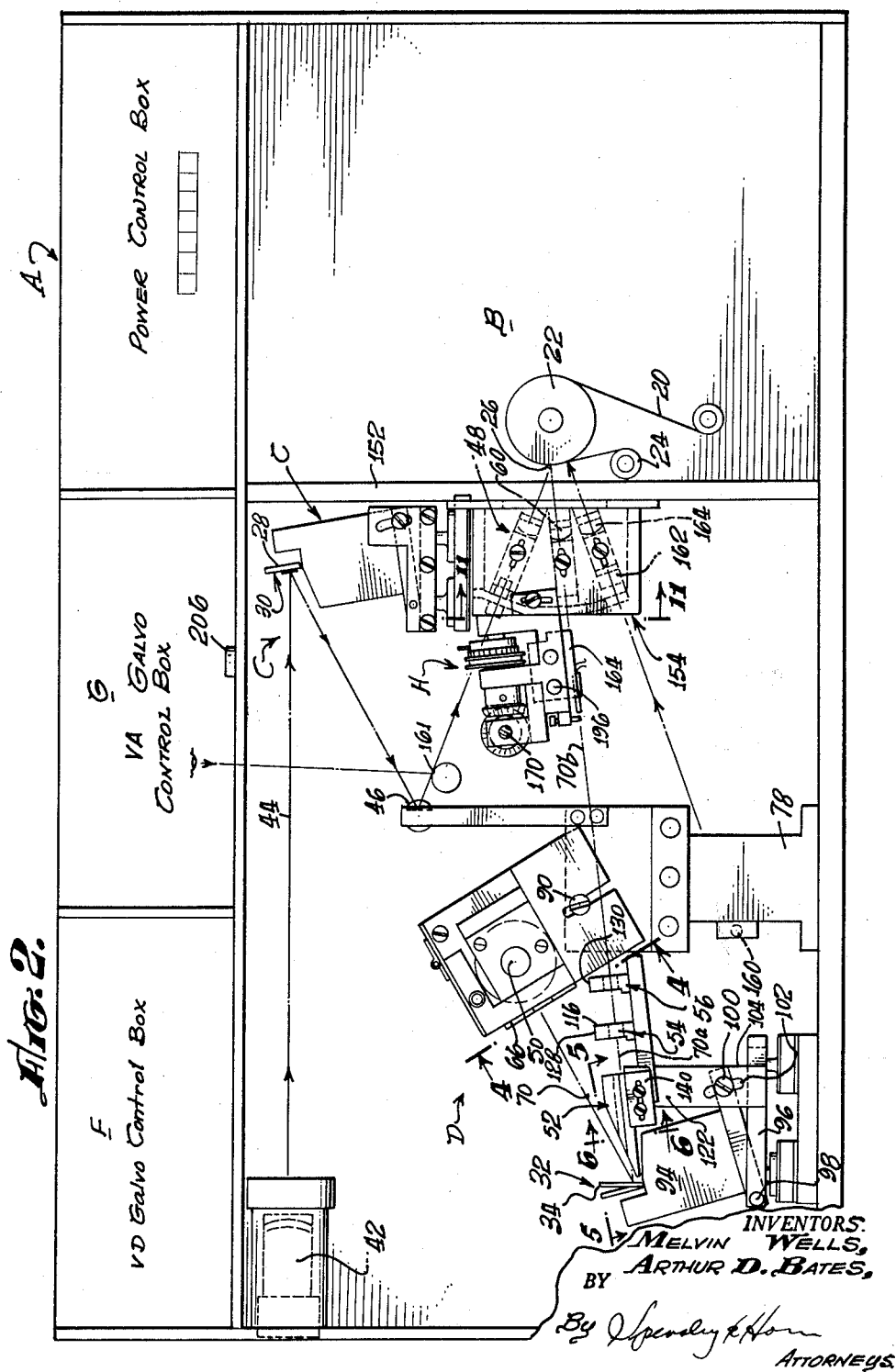

MELVIN WELLS,
ARTHUR D. BATES,
INVENTORS.

Oct. 15, 1963  A. D. BATES ETAL  3,107,137
VARIABLE DENSITY CAMERA
Filed May 9, 1960  5 Sheets-Sheet 4
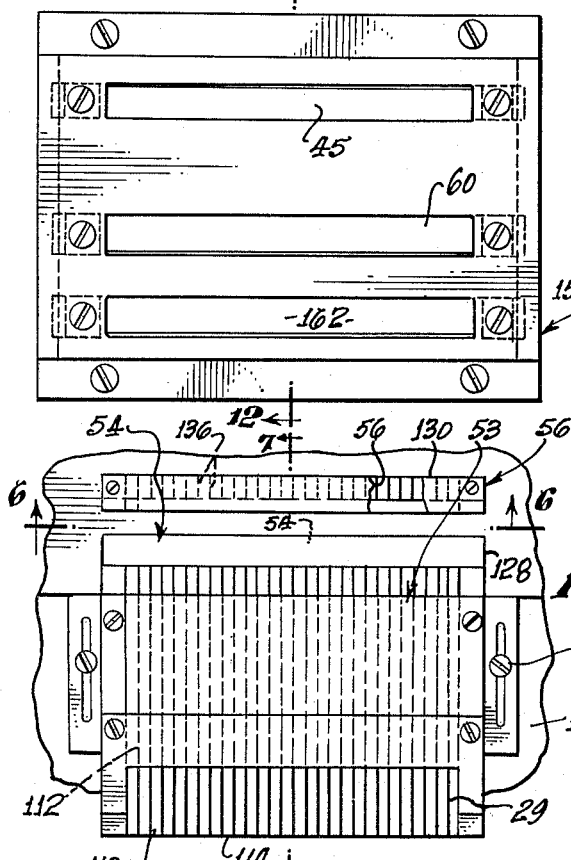
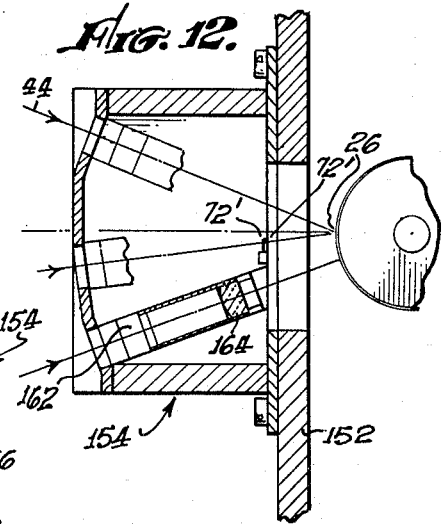
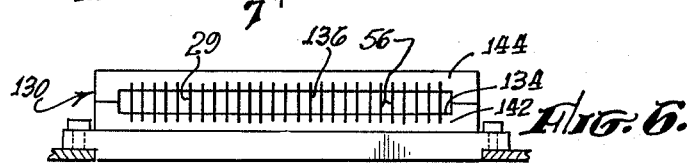
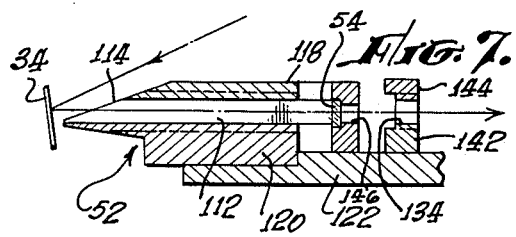
MELVIN WELLS,
ARTHUR D. BATES,
INVENTORS.
ATTORNEYS.

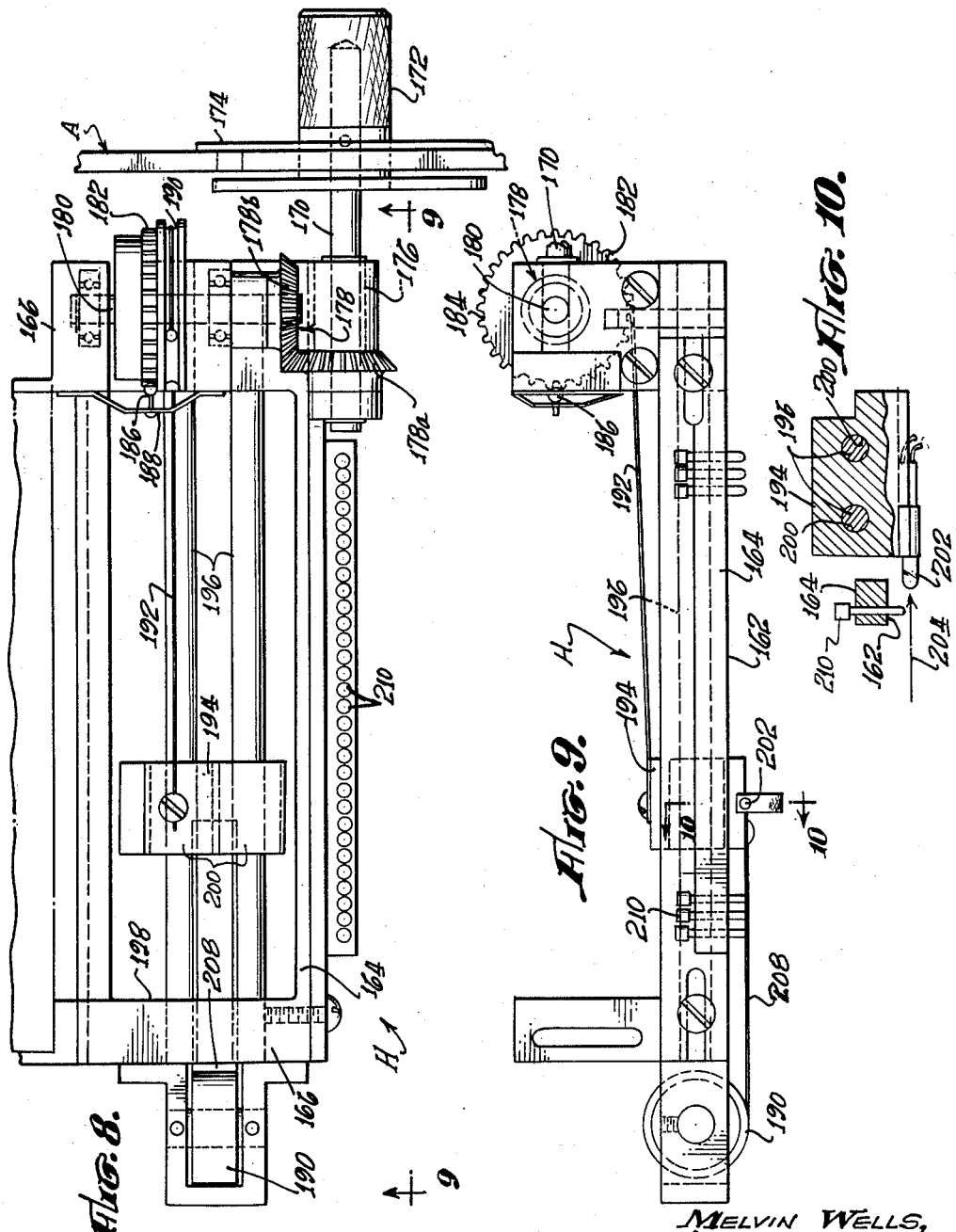

United States Patent Office

3,107,137
Patented Oct. 15, 1963

3,107,137
VARIABLE DENSITY CAMERA
Arthur D. Bates, San Jose, and Melvin J. Wells, Torrance, Calif., assignors to Western Geophysical Company of America, Los Angeles, Calif., a corporation of Delaware
Filed May 9, 1960, Ser. No. 27,851
11 Claims. (Cl. 346—33)

The present invention relates to apparatus for making photographic records of transient signals and more particularly to an improved method and apparatus for forming a variable density time scale record of such transient signals.

In many applications, such as seismographic surveying, it is necessary to record the intensity of transient signals as a time scale record, such that the intensity of an input signal is clearly discernible from the record and that the record can be viewed as a meaningful whole. Various types of records are well known to the art as are various methods and means for forming such records.

As an illustrative application of the use of such records, seismic surveying can be briefly described and the present invention will be considered in connection therewith for purposes of clarity of description only. It is to be understood that the present invention is equally applicable to other arts and fields in which a time scale record of transient signal intensity is necessary or desirable.

Briefly, in making seismographic surveys by the reflection method, a seismic disturbance is initiated at a selected point on or adjacent the earth's surface and reflected seismic waves are detected at a plurality of points spread out in a selected pattern on the earth's surface. The seismic waves are detected by sensitive instruments which convert the seismic energy to electrical signals of comparable intensity. These electrical signals are amplified and recorded on a multi-channel recording apparatus, or seismograph in this application. It is with such recording that the present invention deals.

Depending on the recording method used, the seismograph records may be of the variable amplitude type, wherein the record is produced in the form of an oscillatory line whose amplitude of oscillation is proportional to the intensity of the electrical impulses which, in turn, vary in accordance with the intensity of a reflected wave at a seismometer.

Another well-known type of seismograph record is the variable area type, wherein the width of a band of color contrasting with the background varies in proportion to the intensity of an electrical impulse produced by suitable recording instruments in response to reflected seismic waves. Other types of seismograph records are also well-known to the art, such as coded gradient recordings.

However, each of the various types of seismograph records presently known to the art has its own peculiar advantages and disadvantages. Basically, a seismograph record section should provide an overall representation of seismographic reflection energy obtained over a sequence of spread locations. In addition, it is highly desirable that a range of energy levels be recordable and measurable and that correlative events be clearly identifiable when the record section is viewed as a whole, as for example, by viewing it at a distance.

Variable density recordings of the type well known to the art are particularly advantageous to discern single events and to correlate a whole record. However, prior to the present invention, suitable and accurate variable density records have been difficult to obtain. Variable density records are produced by exposing a light sensitive recording medium to light, the intensity of which is proportional to the intensity of the signal being recorded.

The most common method of the prior art for obtaining such a record has been to employ a specially made lamp whose light varies in brightness in relation to the voltage input to the lamp. The disadvantages of such a system are apparent in that a number of lamps must be used for multi-channel recording, their response characteristics must be uniform, the size is restricted, and the recording film must be sensitive to the particular color of light generated by the special lamps. A further disadvantage of this system is the necessity for special cameras and amplifiers in addition to those used for other types of recordings, it being advantageous to be able to produce several types of records with the same equipment.

Another variable density method of the prior art has been to use a modulated filter to vary the intensity of the light transmitted to the film from a constant intensity source.

Other methods for variable density recording are known to the art but all possess certain disadvantages due primarily to the fact that balancing of light intensities and of the rates of light variation with respect to signal variation between adjacent channels is a difficult, time-consuming and frequently recurring task. The characteristics of such systems generally vary in a severe manner with time.

Since the signal intensity varies over a wide range it is difficult to obtain an overall representation of signal energy by utilizing a single recording method. That is, by the use of variable amplitude recording, for example, the oscillograms are difficult to correlate visually when viewing a record section in its entirety. Such sections are "picked" manually to emphasize correlative events before the record section can be viewed as a meaningful whole. By conventional amplitude recording methods the traces are allowed to overlap to present a definition of minor events. In order to avoid the confusion of overlapping traces and to permit certain types of automatic data processing a conventional clipped record is often used in which the traces are optically clipped and the excursion limited to a given track width. In doing so, however, much information is necessarily lost. Similarly, each of the other recording methods known to the prior art have disadvantages when utilized to record signal intensities which vary over a considerable range. Channelized variable area recordings have a limited range of energy levels and are also somewhat difficult to correlate visually. Coded gradient, frequency modulated and other quasi-variable-density records are achieved at the cost of additional complex circuitry and are difficult to interpret accurately.

Accordingly, it is often advantageous to utilize two recording methods which are compatible to combine the desirable characteristics of each. A variable area or variable density recording can be superimposed in the same channel with a variable amplitude recording at different ranges of signal amplitude, at overlapping ranges of signal amplitude, or at corresponding ranges of signal amplitude depending upon the information required. Thus, in a single channel combinations or variations of data normal to the art can be recorded. For example, a variable amplitude recording can be made with the amplitude levels so adjusted that only at the lower amplitude levels of the signal is the trace record upon the record, while at higher amplitude levels of the signal a variable area recording is produced in the same channel. In order to utilize a variable density recording in combination with a variable amplitude recording it is necessary that the variable density recording method and apparatus be compatible with the variable amplitude recording apparatus.

A further problem encountered in the prior art in connection with the use of variable density records is uniformity between recordings as discussed briefly hereinbefore. For example, in seismograph recording a plurality of channels is recorded on a strip of photosensitive material with each of the channels corresponding to a signal input from the respective seismometer group in the selected pattern on the earth's surface. A number of these strips are then assembled to form a representation of the reflected energy of a large underground area with signals recorded at different times by a plurality of seismometer patterns. Thus, each recorded strip corresponds to an area of exploration and a number of such strips are recorded at different times and later assembled to show an overall representation of a larger area of interest. Since the density of the exposure upon the photosensitive material at a given time is proportional to, or a function of, the intensity of the signal received at the corresponding seismometer at that time, it is essential that in each channel equal density of exposure be obtained for equal signals. That is, in each channel of the seismograph strip a signal of given amplitude must produce equal recorded density. Similarly, since strips are then assembled into a whole the recorded densities in different strips must be uniform for the same signal amplitude if the overall representation is to be meaningful.

Accordingly, it is a primary object of the present invention to provide an improved method and apparatus for variable density oscillographic recording.

It is another object of the present invention to provide an oscillographic apparatus for recording variable density records in which the density of recordation can be predetermined for a given signal intensity.

A further object of the present invention is to provide an oscillographic recording apparatus in which a variable density record can be recorded in a channel with a variable amplitude recording.

It is another object of the present invention to provide an improved variable density recording method and apparatus in which the light intensities and rates of light variation with respect to signal variation between adjacent channels can be easily and accurately balanced.

A still further object of the present invention is to provide a variable density recording apparatus which can be biased to record signals within a predetermined range of signal amplitudes.

Yet another object of the present invention is to provide an improved variable density oscillographic recording apparatus in which the variation of signal input is clearly discernible.

It is an additional object of the present invention to provide an improved variable density multi-channel recording apparatus in which the channels can be readily balanced with a reduced tendency to drift with time.

A further object of the present invention is to provide such a recording apparatus which is simple and efficient in construction and operation.

It is another and principal object of the present invention to provide an improved variable density camera which by elimination of the light-diffusing devices or optical wedges heretofore used in the art for variable density oscillographic recording, produces variable density traces of equal quality to variable amplitude recording with no loss of frequency range.

The present invention is an improved oscillographic recording apparatus for recording transient input signals which includes an improved variable density recording oscillographic apparatus in which light reflected from a light source of substantially constant and uniform intensity is converted to a beam of light of fixed width and uniform but variable intensity for recordation upon a light-sensitive recording medium. The variation of intensity is a function of the variation of the magnitude of the input signal. The variation in intensity is obtained by utilizing a mirror and recording medium, and positioning the photosensitive recording medium at the image point of the mirror with means between the mirror and the recording medium for passing a portion of the light reflected by the mirror which portion is determined by the position of the mirror. The mirror is varied in position in response to the input signal. The present invention also provides means for monitoring the intensity of the light transmitted to the recording medium prior to recordation thereon for calibration or biasing prior to recordation upon the recording medium. The present invention also includes an oscillographic recording apparatus wherein a variable density recording apparatus in accordance with the present invention is provided in combination with a variable amplitude recording apparatus. The two types of recordings can be alternatively recorded in a single channel at different ranges of magnitude of the input signal, or can be recorded in a single channel at two ranges which overlap in input signal magnitude, or can be recorded within a single channel at the same ranges of magnitude of the input signals.

More specifically, a presently preferred embodiment of an improved variable density recording oscillographic apparatus in accordance with the present invention includes a moving light-sensitive recording medium such as a photosensitive recording strip, and a galvanometer mirror. The galvanometer mirror oscillates about an axis in response to the input signal to be recorded. Light is transmitted to the mirror and reflected therefrom through a stop aperture of fixed dimension. The stop aperture is at a position between the galvanometer mirror and recording medium and is so constructed and arranged that it permits the passage of a portion of the reflected light therethrough, which portion is determined by the angular position of the galvanometer, which is in turn determined by the intensity of the signal input to the galvanometer. The beam of light which is thereby varied in quantity is transmitted to the moving recording strip. The recording strip, aperture, optical components and reflecting galvanometer mirror are positioned at interdependent positions one from the other such that the recording strip is substantially at the image point of the galvanometer mirror. Accordingly, the recording medium "sees" the galvanometer mirror with the light reflected therefrom being of substantially constant width but varying intensity, which intensity is dependent upon the quantity of light passed through the aperture. In the presently preferred embodiment a stop aperture is positioned at the image point of the light source in order to obtain a density of recordation which varies substantially linearly with respect to the angular position of the mirror. The stop aperture can be varied from this position and can be formed by the channelizer or a lens system with the result that a variable density record will still be obtained so long as the recording medium is substantially at the image point of the galvanometer mirror.

The novel features which are believed to be characteristic of the invention both as to its organization and method of operation, together with further objects and advantages thereof, will be better understood from the following description considered in connection with the accompanying drawings in which a presently preferred embodiment of the invention is illustrated by way of example. It is to be understood, however, that the drawings are for the purpose of illustration and description only, and are not intended as a definition of the limits of the invention.

In the drawings:

FIGURE 2 is a view in elevation of the complete apparatus as shown in FIGURE 1 but with some portions thereof shown schematically since those portions form no part of the present invention;

FIGURE 3 includes the light paths and various components of the recording apparatus shown diagrammatically for clarity of description;

FIGURE 5 is a view taken along line 5—5 of FIGURE 2 showing the channelizer lens assembly and stop aperture assembly of the present apparatus;

FIGURE 6 is a view in elevation taken along line 6—6 of FIGURE 2 showing the stop apertures of the present invention;

FIGURE 7 is a sectional view in elevation taken along line 7—7 of FIGURE 5;

FIGURE 8 is a top plan view of the monitoring apparatus of the present invention;

FIGURE 9 is a front view taken along line 9—9 of FIGURE 8;

FIGURE 10 is a sectional view taken along line 10—10 of FIGURE 9;

FIGURE 11 is a front view taken along line 11—11 of FIGURE 2;

FIGURE 12 is a sectional view taken along line 12—12 of FIGURE 11; and

It is to be expressly understood that although seismographic exploration is used as an application in which the present invention is particularly desirable, it is not limited thereto and may be used in any application of an oscillographic camera in which it is desirable to obtain a variable density record of oscillatory signals. Although a twenty-four channel oscillographic camera and recording system are described in detail throughout the specification, it is to be understood that the present invention can also be utilized in a single channel oscillographic camera as well as a camera having any number of channels. Further, in most respects each channel of the twenty-four channel apparatus is similar to all other channels and accordingly, in many instances, a complete description of a single channel is utilized hereinafter for clarity of description. The term transient input signals is used throughout the following specification in reference to those signals which are to be recorded upon a multi-channel time-scale record. Such input signals in seismographic exploration may be the result of a previously recorded record or may be directly transmitted from field detection units such as detector groups or other shock-sensing devices.

Figure 1:
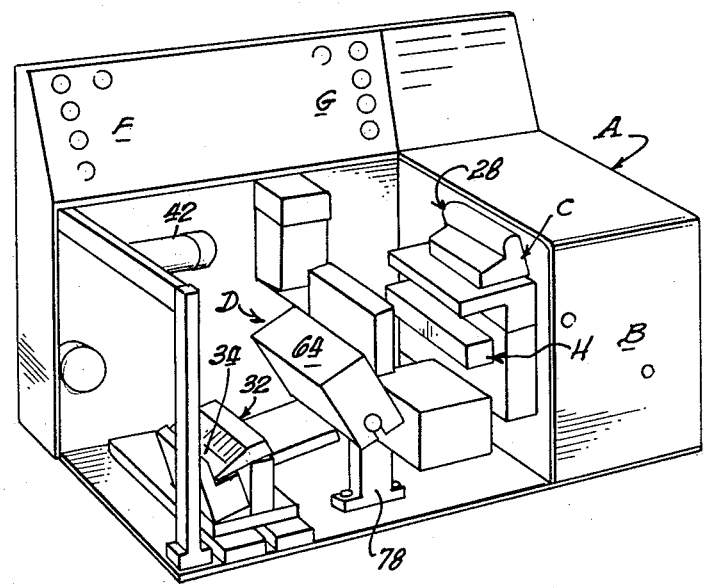
FIGURE 1 is a partially diagrammatic view in perspective of a presently preferred form of a multichannel recording apparatus in accordance with this invention.

Referring now to the drawings and particularly FIGURES 1 and 2, the presently preferred embodiment of the present invention includes, in general terms, a housing A within which are contained: a light-sensitive recording material section B, a variable amplitude recording section C, a variable density recording section D, a biasing or adjusting section F for the variable density section D, a biasing or adjusting section G for the variable amplitude section C, and monitoring means H.

The light-sensitive recording section B includes means for mounting and moving a strip of photosensitive recording medium such as photographic film or a strip of photosensitive paper 20. The photosensitive strip 20 is positioned in a substantially vertical plane at a predetermined distance from the galvanometer mirrors of the variable density section as described in detail hereinafter. The photosensitive strip as mounted on an idler roll 22 and a driven roll 24 which is driven by a motor to move the recording strip 20 at a constant rate of speed in an approximately vertical plane. The means for mounting and moving the recording strip are all well known to the art. Since the recording strip is moved at a constant rate of speed in the vertical direction, signals impressed on the strip at a recording station 26 which is vertically stationary will form a time-scale record of such signals.

In both the variable amplitude section and variable density section of the oscillographic recording apparatus of the present invention, galvanometer mirrors of the well-known type are utilized to transform a transient input signal to a visually recordable signal of magnitude proportional to the intensity of the input signal. Thus, in the variable amplitude section C a galvanometer bank 28 is positioned in the apparatus with a plurality of galvanometer mirrors 30 arranged in side-by-side relationship with one of the mirrors 30 in each channel of the multi-channel recording apparatus. The variable amplitude mirrors are preferably cylindrical mirrors. A galvanometer bank 32 is positioned within the apparatus as a part of the variable density section thereof as described in further detail hereinafter.

Figure 3:
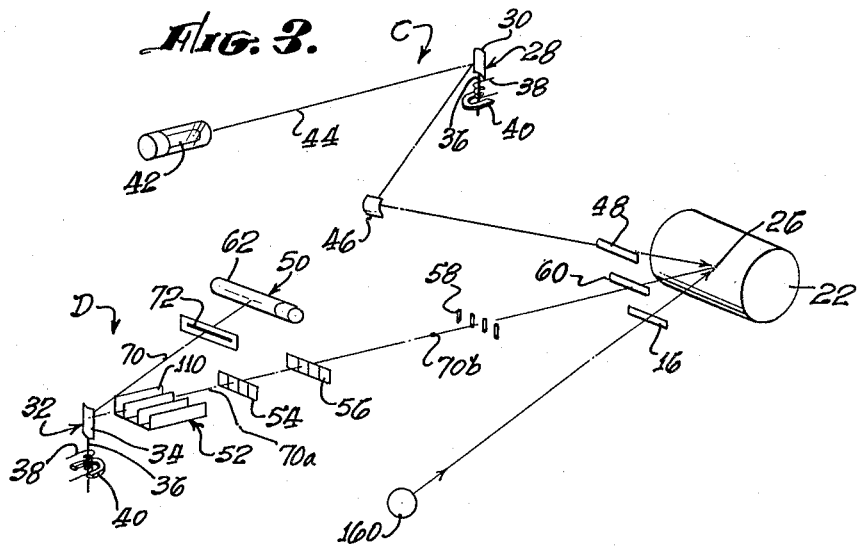
FIGURE 3 is a diagrammatic view in perspective of the presently preferred embodiment of the present invention as shown in FIGURE 1 for obtaining a combination variable amplitude and variable density oscillographic recording in accordance with the present invention.

An equal plurality of mirrors 34 is arranged in side-by-side relationship for the variable density section D of the apparatus with one of the mirrors 34 in each of the channels. The variable density mirrors 34 are preferably spherical mirrors and extend upward from the galvanometer bank unit 32. Referring now to FIGURE 3, where such units are shown diagrammatically, each mirror 30 and 34 is affixed to a shaft 36 which is in turn affixed to the movable coil 38 of a galvanometer. The coil of each galvanometer is rotated within a permanent magnet 40 by an amount proportional to the electrical signal impressed upon it. The intensity of the electrical signal is in turn determined by the intensity of the input signal which in the case of seismic exploration is proportional to the intensity of the seismic wave received by the respective seismometer group. The electrical input signal is transmitted to the respective galvanometer, through an amplifier such that the galvanometer coil with the mirror shaft affixed thereto is caused to rotate. Thus, each mirror is rotated about the axis of the shaft through an arc which is proportional to the input signal for the respective channel. The galvanometer mirrors are positioned such that the axis of the shaft is substantially vertical or is otherwise so positioned that light impinged upon the mirror from the light source of the section is reflected to the recording station 26 on the photosensitive paper as discussed more fully hereinafter. As the mirror moves about its axis the light reflected thereby is deflected in the horizontal direction, or the direction transverse to the direction of movement of the photosensitive paper 20.

Referring particularly to FIGURE 2, the variable amplitude section C is of the type well known to the art and includes a vertical filament light source 42 which transmits light to the mirror 30. The image of the vertical filament is reflected by the galvanometer mirror 30 and by a redirecting mirror 46 into a collimating and focusing lens 48 which focuses the reflected light to a point of light at the recording station 26 on the photosensitive strip 20. The input signals of varying magnitude will cause the mirror 30 to be rotated in direct proportion to the intensity of the input signal and will thereby cause the point of light at the recording station 26 to be deflected in a horizontal direction as a trace upon the vertically moving photosensitive strip. The trace which is horizontally deflected in response to the input signal will have the characteristic of the input signal reaching the galvanometer, all of which is well known to the art to produce the conventional variable amplitude record.

Figure 4:
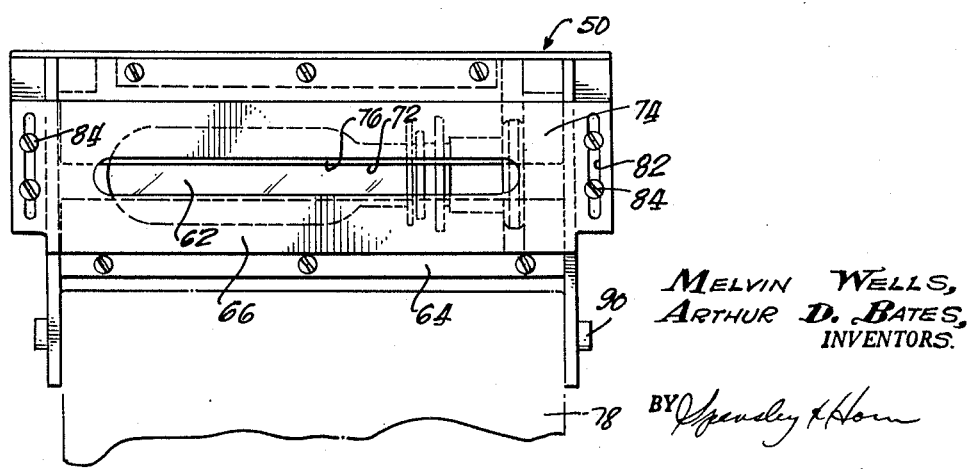
FIGURE 4 is a view taken along line 4—4 of FIGURE 2 showing the light source utilized in the variable density recording apparatus in accordance with the present invention.

Referring now to FIGURES 2 and 3, the variable density section D in accordance with this invention includes a light source 50, a plurality of galvanometer mirrors 34, a channelizer 52, a plurality of focusing lenses 54, a plurality of stop apertures 56, a plurality of monitoring channels 58, and a condensing lens 60. In this embodiment, referring to FIGURES 2 and 4, the light source 50 is of substantially greater horizontal width than height and is so oriented that each mirror will receive light across the full width of its face at all angular positions of the mirror. If separate filaments are used this result can be achieved by proper positioning of the filaments to subtend a sufficiently large arc relative to the mirrors to furnish complete coverage. Width of the horizontal light source for optimum results can be readily determined by one skilled in the art in view of the foregoing and the description of the operation of the apparatus hereinafter. In the embodiment shown, particularly in FIGURE 4, a linear filament lamp 62 is positioned within a lamp housing 64 in a substantially horizontal position. The housing is mounted with the forward face 66 toward the mirrors 34 and in a plane transverse to the direction of incidence of the light 70 projected to the mirror. The angle of incidence upon and reflection from the mirrors is determined to conduct the reflected light to the recording station 26. In the forward face of the housing a horizontally extending slot 72 is provided approximately along the centerline of the lamp. An adjusting mask 74 is affixed upon the forward surface movable upwardly and downwardly therealong. An adjusting slit 76 has a height substantially equal to the height of the slot 72 and a length equal to the length of the image to be transmitted. By moving the slit 76 out of register with the slot 72, the height of the projected line can be varied. The lamp housing 64 is mounted within the apparatus housing A upon a standard 78 which does not extend into any of the light paths. The lamp housing 64 is mounted on the standard by means of a bracket 80 with adjusting slots 82 and screws 84 to allow movement parallel to the forward surface 66 to vary the angle of incidence of the beam 70. In addition, means are provided to move the brackets and lamp housing horizontally upon rails to vary the horizontal position of the lamp housing.

As discussed above, each of the galvanometer mirrors 34 extends upwardly from the galvanometer bank unit 32 in which the coils, magnets, and associated circuitry are contained. The galvanometer bank 32 is positioned within a galvanometer housing. The housing is inclined somewhat about a horizontal axis to properly orient the axis of rotation of the mirrors to reflect the light therefrom to the recording station 26. The galvanometer housing 94 is pivotally mounted upon a base 96 for pivotal movement about a horizontal axis 98. Thus, the housing is affixed to a pivotable base with a locking screw 100 positioned in an arcuate slot 102 in a bracket 104. Pivotal movement of the base thus varies the axis of rotation of all of the mirrors equally. Light projected to the mirror 34 will therefore be reflected along a light path 70a from the mirror.

After being reflected by the mirrors 34, the paths of light 70 are projected through an excursion limiter box or channelizer 52. Thus, between the mirrors 34 and the photographic strip 20, the channelizer 52, having a plurality of optical channels 110, is positioned. The number of channels 110 in the excursion limiter box is again equal to the number of mirrors, or twenty-four in this embodiment. Referring now to FIGURES 2, 5, 6, and 7, the channelizer 52 is shown in detail. Each of the optical channels formed by the channelizer is of sufficient length and width to provide an optical channel for the light reflected from the respective mirror. That is, the light reflected from each mirror can be transmitted only through its respective optical channel to the recording station 26. The optimum dimensions necessary in order that the film can "see" only one mirror through each channel and the optimum position of each channel can be readily determined by one skilled in the art in view of the following description. In the present embodiment the channels 58 are defined by positioning a plurality of elongate thin plate-like members 112 in spaced-apart side-by-side relationship extending from the forward end 114 of the channel to the gathering lenses 54 as described hereinafter. The channelizing members 112 are positioned between an upper plate 118 and a lower plate 120 which form the body of the channelizer. This channelizer body is mounted upon the the bracket 122 and is movable along the direction of light path 70a by means of adjusting screws 124.

Positioned forwardly of the channelizer 52, between the channelizer and the recording film strip 20, are two similar partitioned members, the first of which, 128, includes a plurality of gathering lenses 54 and the second of which, 130, defines a like plurality of stop apertures 56. Both the gathering lenses 54 and the stop aperture frames 130 are positioned along the light path 70b. The members 128 and 130 are similar in construction and comprise a frame as shown in FIGURES 5, 6 and 7 which defines a slot 134 of substantial height and horizontal length. A plurality of upstanding plate-like members 136 divide the slots into openings through which the light for each channel can pass. The upstanding members are spaced apart at substantially equal intervals, which intervals are in turn to the width of a recording channel of the apparatus. The members 128 and 130 are mounted upon a mounting arm which extends outwardly from the bracket 140 substantially parallel to and beneath the path of the light beam 70a. Each of the members includes a base portion 142 and an upper portion 144 which are assembled to define the slot 134. Within each of the openings defined between the members 136, a gathering lens 54 is positioned in the member 128. In the stop aperture member 130, however, no lens is present and an opening 56, only, is defined between the upstanding members 136 in the member 130. This opening 56 in the stop aperture member 130 defines a stop aperture in the optical sense.

The apertures are so designed and positioned that they serve as an aperture stop for each channel in controlling the quantity of light transmitted therethrough. Accordingly, the aperture assembly 130 is positioned interdependent with the gathering lenses 54 such that each aperture 56 is at the image point of the filament. That is, the filament, reflecting mirror, gathering lens and aperture 56 are positioned interdependently such that the light projected from the filament is focused by the lens 54 at the aperture stop. It should be noted at this point that although lenses are utilized in the illustrative embodiment, by proper use of spherical mirrors the light can be so focused without the lenses 54. Thus, at the image point of the light source a horizontal band of light corresponding to the horizontal slot 72 in the light source is focused and the width of the band which the aperture "sees" is dependent upon the angular position of the reflecting mirror 34. That is, when the mirror is rotated to one extremity of its angular position with respect to the aperture, none of the horizontal light band is imaged at the aperture, while to the contrary, when the mirror has rotated through its full angular position with respect to the aperture, the band of light extends across the full width of the aperture. It can be seen, therefore, that the quantity of light passing through the aperture depends upon the angular position of the mirror which in turn depends upon the intensity of the signal transmitted to the galvanometer. At low signal intensities the aperture would "see" no light projected from the filament and at intermediate positions of the mirror corresponding to intermediate intensities of input signals the horizontal band of light would extend partially across the width of the aperture and the aperture would see a corresponding quantity of light. Similarly, the mirror at high signal intensity would reflect the horizontal band of light across the full width of the aperture and the aperture would see a greater degree of reflected light.

After passing through the aperture stop 130, the light beam is reversed since it has passed through its image point at the aperture and continues onward toward the photographic film strip as a light beam 70b. Positioned between the aperture stop and the recording station 26 is a condensing lens 60 for the variable density section B of the apparatus.

Although a specifically dimensioned stop aperture is located at the image point of the light source in the presently preferred embodiment to vary the intensity of light passing to the recording medium, a variable density record will still be obtained if the stop aperture is moved from the image point of the light source. More specifically, the stop aperture acts to govern the quantity of light passing down the optical channel after being reflected from the galvanometer mirror. It can be seen by one skilled in the art that other components of the optical or channelizing system will perform a similar function if the stop aperture, per se, is removed. That is, the channelizer will vary the quantity of light admitted to the channel and will act as a stop aperture. Similarly, the lens 54 will pass only the quantity of light which strikes its surface to thus act as a stop aperture. Thus, dependent upon the angular position of the mirror, the lens will receive a greater or lesser quantity of light reflected to its surface by the mirror. It has been found that with a stop aperture, utilized as described above at the image point of the light source, a variable density record is obtained upon the recording medium at the image point of the reflecting mirror, which density is substantially linearly proportional to the angular position of the mirror for the small angular rotations customarily encompassed by the galvanometer. With the stop aperture, or a component acting as its equivalent, positioned other than at the image point, the variable density of the record may be a non-linear function of the position of the mirror. In the preferred embodiment a stop aperture is positioned at the image point of the light source such that the image is a horizontal band of light which varies in width dependent upon the angular position of the mirror. It should be noted, however, that a variable density record will be obtained in accordance with the present invention although a light source of another configuration is utilized. That is, a variable density record will be obtained upon the recording medium positioned at the image point of the mirror so long as the quantity of light reflected by the mirror and transmitted along the channel is dependent upon the angular position of the mirror.

Referring now to FIGURES 2, 3, 11 and 12, there is a condensing lens assembly box mounted upon the panel 152 forward of the film strip 20. The lens box includes a lens assembly for transmitting both the variable density channels to the recording film strip and the variable amplitude channels to the recording film strip. In connection with the variable density light path, the lens assembly box 154 defines a frame within which is positioned means defining a path through which the light in each channel passes to the moving recording film strip. A gathering or condensing lens 60 is positioned within the light path at the proper position to condense and focus the light transmitted through the channels upon the moving strip film. The condensing lens 60 extends across the full width of the channels and is of the type which optically condenses the light passing therethrough substantially to a horizontal line of light. Thus, the light 70b striking the condensing lens 60 is condensed substantially to a horizontal line of light and projected to the photographic strip. The strip is in the position such that the recording station 26 is at the image point of the mirrors through the lens assemblies positioned in the light path 70a, 70b. That is, at the point 26 where the light path strikes the photosensitive strip, the strip sees the mirror in focus with the band of light extending across the full width thereof. In seeing the mirror, however, the intensity of light reflected at the mirror surface is completely dependent upon the light passing through the stop aperture 56. Thus, corollary to other optical instruments, the strip sees the object which is imaged upon it, namely the galvanometer mirrors. It sees the band of light across the width of the mirror, however, with an intensity which is determined by the quantity of light passing through the stop apertures which is in turn dependent upon the angular position of the mirror. When the horizontal beam of light is condensed substantially to a horizontal line of light, therefore, the line of light completely fills the width of the channel being recorded upon the recording strip. The density or intensity, however, of the line of light is determined by the angular position of the mirror and the quantity of light which passes through the aperture. The channelizers and optical path are such that the recording strip always sees the mirror across the full width of the strip; that is, the mirror never turns sufficiently that the film can see either vertical edge thereof.

Referring still to FIGURES 11 and 12, a similar condensing lens arrangement is provided in connection with the variable amplitude section C of the apparatus such that the light path 44 passing from the mirror 30 to the reflecting mirror 46 and thence downward through the variable amplitude condensing lens 48 is condensed to a point of light which varies horizontally within the respective channel. Similarly, a spreading lens and condensing lens are provided for a timing signal which is impinged at a position proximate the recording station 26. That is, by means well known to the art a modulated glow tube 160 is provided within the apparatus to transmit intermittent light which is spread to a horizontal beam of light by a spreading lens 162 and condensed to a horizontal line of light at a condensing lens 164. The glow modulator transmits the line of light at regular time intervals to form timing lines upon the recording strip. Positioned in the light path of the variable density section proximate the recording steps are a plurality of vertically extending members 72' which are positioned at the edges of the various channels to provide an opaque line between the various light paths to in turn provide an unexposed delineating line between the various channels exposed upon the recording strip so that the boundaries of each channel are readily distinguishable.

Also provided in the apparatus is an opening through the upper cover thereof through which the operator can look downward into the apparatus and view a check mirror 161 which is so oriented that one looking through the opening will look downward along the light path of the variable amplitude section and see the photosensitive strip being exposed. Thus, it is possible to see both the variable amplitude point of light and the variable density line of light to adjust the light paths and particularly to locate the variable density line so that it is in alignment with center of the channel.

As shown in FIGURE 2 diagrammatically, there are two control sections F and G, one of which is an adjustment section for the variable density galvanometer units, and one of which is a similar adjusting section for the variable amplitude galvanometer units. By means well known to the art there is provided a circuit in connection with each galvanometer whereby the voltage supplied to the coil of each galvanometer unit can be biased to define the zero signal intensity for each channel. That is, the galvanometer can be biased to the point at which a given signal must be supplied before any recording occurs in the respective channel.

Figure 13:
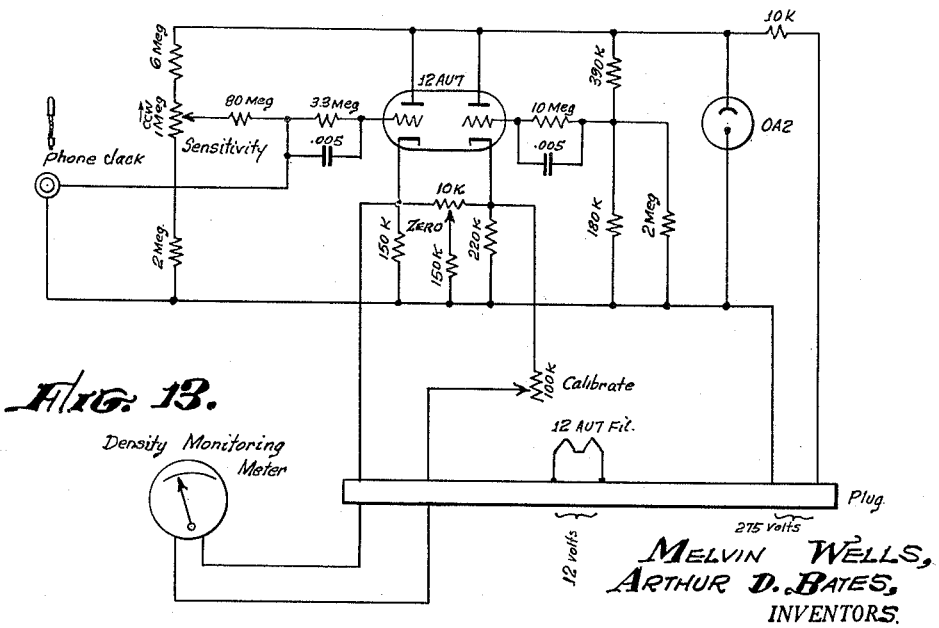
FIGURE 13 is a circuit diagram of the monitoring system in accordance with the presently preferred embodiment of this invention.

Referring now to FIGURES 2, 8 and 9, the monitoring and calibrating system in accordance with the present invention is shown. As discussed hereinbefore, after passing through the stop aperature 56, the light path 70b is a beam of light which is later condensed to a horizontal line of light. The monitoring section H is positioned forwardly of the lens housing 154 and at a distance above the light path 70b such that the lower surface 162 of the apparatus is somewhat above the upper edge of the beams of light being transmitted along the various channels. The monitoring apparatus includes a monitoring base section 164 which is mounted upon suitable mounting brackets extending forwardly of the lens housing. Thus, as shown in FIGURES 2, 8, 9 and 10, the monitor base 164 is mounted upon a mounting bracket 166. The base 164 is mounted such that the bottom surface 168 thereof is parallel to the light paths. A manually rotatable shaft 170 extends through the outer wall of the apparatus housing A and has a manually operable knob 172 at the outer surface of the panel 174 of the apparatus A. The shaft 170 is rotatably mounted with respect to the monitor base assembly 164 within a bearing 176. The shaft 170 is therefore rotatable within the bearing 176 in response to manual rotation of the knob 172. A right angle gear train 178 is provided with one gear 178a being mounted upon the shaft 170 and a mating gear 178b mounted upon a transverse shaft 180 which is again mounted for rotating movement within bearings affixed to the monitor base 164. A detent gear 182 is affixed to the transverse shaft 180 for rotation substantially in the plane transverse to the longitudinal axis of the monitor. The detent gear has a series of detent grooves 184 which are equal in number to the number of a channels in the apparatus. A ball detent is spring loaded to engage the detent grooves. That is, a detent ball 186 is spring loaded by means of a spring housing 188 to be urged inwardly into the detent grooves 184 and allow the shaft 180 to be rotated from position to position in response to rotation of the knob 172. Adjacent the detent gear 182 is a pulley 190 from which a cable 192 is extended along the length of the monitor base 164. The end of the cable is affixed to a slide 194 which is slidably mounted upon suitable rails of the base 164. That is, in the embodiment shown, the base 164 is in the form of a frame having a pair of parallel rods 196 extending longitudinally across an opening 198 with the slide 194 having openings 200 therethrough which are slidably mateable with the guide rods 196. Thus, rotation of the knob 172 will cause the slide 194 to be moved along the monitoring assembly transverse to the various light paths 70b, and the movement will occur from detent to detent position. The detents are so oriented that the slide will move by the width of one channel at each detent position of the knob 172. Extending downwardly from the slide 194 is a photo-diode 202, which accordingly extends below the monitoring base 164 and into the upper portion of the various light paths 70b. The portion of the light which is intercepted by the photo-diode 202 is a portion which is not normally usable and will not be transmitted to the recording station 26. Thus, as shown in FIGURE 10, a normal variable density horizontal light beam is shown schematically as 204. This corresponds to the horizontal beam which will be later reduced to a horizontal line of light of varying intensity. As shown in FIGURE 10, the photo-diode 202 intercepts the upper portion of the beam. Thus, the photo-diode is exposed to light passing along the light path 70b. Suitable circuitry as shown in FIGURE 13 is provided for determining the intensity of light striking the photo-diode 202. The intensity of the light is transmitted by means of the circuitry and metered at a density meter 206 mounted at the upper surface of the apparatus housing A. Spring means 208 are provided for urging the slide in the direction opposite from the direction of pull of the cable 192. Thus, by rotating the knob 172, the photo-diode 202 can be moved into a position corresponding to each channel and a reading will be shown at the density meter 206 on the housing to show the quantity of light transmitted along each channel. Accordingly, the intensity can be monitored and changed until the light passing along each channel for a given input-signal intensity is equal. A shadow adjusting screw is provided in each of the channels of the apparatus forwardly of the monitoring and calibrating apparatus H. The shadow adjusting screws 210 are vertically movable upward and downward into each of the channels. By moving the opaque shadow adjusting screw downward into the channel a quantity of light is removed from that channel so that all of the channels can be calibrated for a given signal intensity.

Thus, in operation a plurality of input signals emanating from a source such as a plurality of seismic detector groups is transmitted to the apparatus with one of the input signals being transmitted to one channel of the apparatus. The signal is transmitted to the galvanometer in the channel of the variable amplitude section and to the corresponding galvanometer in the respective channel of the variable density section. Referring now particularly to FIGURE 3, the input signal causes the variable amplitude galvanometer 30 to be oscillated through an angular movement proportional to the intensity of the signal. The light 44 emanating from the light source 42 is reflected by the galvanometer mirror 30 and redirected by the redirecting mirror 46 to the condensing lens 48. In the condensing lens assembly, the beam of light is transposed to a point of light, the horizontal position of which relative to the recording medium 20 is dependent upon the angular position of the galvanometer mirror 30. Thus, the moving recording medium will record a line as a result of exposure to the point of light transmitted by the variable amplitude galvanometer mirror. The recorded line will have location within the width of the channel dependent upon the intensity of the signal transmitted to the variable amplitude galvanometer. Simultaneously, the input signal is also transmitted to the variable density galvanometer and causes the variable density galvanometer mirror 34 to be similarly oscillated by an amount dependent upon the intensity of the input signal. It should be noted at this point that the relationship of the variable amplitude and variable density records which are made in the channel of the recording means can be varied such that both the variable amplitude and variable density record will occur in the channel simultaneously or the variable density record will only occur at a predetermined intensity of the signal at which the variable amplitude record leaves the channel. That, is, the two types of records can be superimposed in the channel at the same signal intensities or can be recorded alternatively within the same channel. When the two types of recordings are being made simultaneously in the same channel, both the variable density and variable amplitude lights will be directed to the recording medium. The variable amplitude light will form a bright spot in the diffuse background of light which constitutes the variable density light. As a result the developed photographic recording medium will show a band of varying shades of grey with an undulating line superimposed thereon which line is always darker than the background. Those skilled in the oscillographic art are familiar with suitable light intensity ranges for each photographic medium which permit distinguishable superposition for several shades of grey as for example, to produce mutually distinguishable variable density recordings, variable amplitude recordings, and timing reference lines simutaneously in each channel as is accomplished in the presently illustrated apparatus. The signal intensity at which either of the two records is recorded in the channel can be determined by proper biasing of the galvanometers for the respective variable amplitude and variable density recording. Accordingly, when the variable density galvanometer mirror 34 is oscillated in response to an input signal transmitted thereto, it reflects the light emanating from the light source 50. The light 70 reflected from the mirror through channelizer 52 passes through the first gathering lens 54. The lens in each channel focuses the light path 70a at the stop aperture 56 of the channel such that an image of the light source as a horizontal band of light is focused at the stop aperture. The quantity of light passing through the stop aperture is therefore dependent upon the angular position of the galvanometer mirror. The light beam 70b which passes through the stop aperture passes beneath the monitoring assembly as described hereinbefore. The beam 70b is condensed to a horizontal line of light by the condensing lens 60 and recorded upon the film strip as a varying density record.

What is claimed is:

1. An apparatus for photographically recording a time-varying signal on a photographic recording medium comprising: means for moving said recording medium in one direction; optical means defining a recording channel on said medium, said channel having length in the direction of motion of said moving medium and having width in the direction transverse thereto; a beam of light defining a point of light incident upon said channel; modulation means for modulating said beam of light in said channel, said modulation means being responsive to said signal; said modulation means acting upon said beam of light to move said point of light in the direction of the width of the channel; a galvanometer mirror pivotally mounted for oscillation about an axis in the direction substantially transverse to the direction of movement of said medium, means for oscillating said mirror about said axis in response to said signal; a light source for directing light to said mirror for reflection thereby to said channel; a stop aperture positioned between said mirror and said recording medium, said stop aperture being of predetermined width and so constructed and arranged as to pass a portion of said light therethrough, which portion is dependent upon the angular position of said mirror; and means for focusing an image of said mirror substantially at said medium in said channel for simultaneously recording a variable density record of said signal with the variable amplitude record of said signal resulting from recordation of said point of light in said channel.

2. An apparatus for photographically recording a time-varying signal upon a photographic recording medium comprising: means for moving said recording medium in one direction; optical means defining a recording channel on said medium, said channel having length in the direction of motion of said moving medium and having width in the direction transverse thereto; a beam of light defining a point of light incident upon said channel; modulation means for modulating said beam of light in said channel, said modulation means being responsive to said signal; said modulation means acting upon said beam of light to move said point of light in the direction of the width of the channel; a galvanometer mirror pivotally mounted for oscillation about an axis with the direction of oscillation being substantially transverse to the direction of movement of said medium, means for oscillating said mirror about said axis in response to said signal; a light source of substantial and predetermined width for transmitting light to said mirror for reflection thereby to said channel; a stop aperture positioned between said mirror and said recording medium, said stop aperture being of predetermined width and so constructed and arranged as to pass a portion of said light reflected by said mirror therethrough which portion is dependent upon the angular position of said mirror; means for focusing an image of said mirror substantially at said medium; means positioned between said aperture and said recording medium for converting said light passed by said aperture to a line of light of constant width at said recording medium in said channel for simultaneously recording a variable density record of said signal with the variable amplitude record of said signal resulting from recordation of said point of light in said channel.

3. An oscillographic recording apparatus for visually recording a time-varying input signal on a time scale channel of a moving photosensitive recording medium comprising: means for recording a first time-scale record of said input signal in said channel; means for forming a time-scale variable density record of said signal in said channel including a galvanometer mirror, said galvanometer mirror being pivotally mounted for oscillation about an axis, means for oscillating said mirror about said axis in response to the intensity of said signal; means uniformly illuminating said mirror and transmitting light to said mirror for reflection thereby; a stop aperture positioned between said mirror and said recording medium, said stop aperture being so constructed and arranged as to pass therethrough a portion of said light reflected by said mirror, which portion is dependent upon the angular position of said mirror; means for focusing an image of said mirror substantially at said medium; means between said aperture and said recording medium for converting said light passed by said aperture substantially to a line of light of constant transverse width at said recording medium in said channel for simultaneously recording said first time-scale record of said signal and said variable density record of said signal in said channel.

4. An oscillograph recording apparatus for visually recording a time-varying input signal on a time scale channel of a moving photosensitive recording medium comprising: means for recording a first time-scale record of said input signal in said channel; means for forming a time-scale variable density record of said signal in said channel including a galvanometer mirror, said galvanometer mirror, said galvanometer mirror being pivotally mounted for oscillation about an axis with the direction of oscilation being substantially transverse to the direction of movement of said recording medium, means for oscillating said mirror about said axis in response to the intensity of said signal; means for transmitting light to said mirror for reflection thereby; a stop aperture positioned between said mirror and said recording medium, said stop aperture being so constructed and arranged as to pass therethrough a portion of said light reflected by said mirror, which portion is dependent upon the angular position of the said mirror; means for focusing an image of said mirror substantially at said medium; means between said aperture and said recording medium for converting said light passed by said aperture substantially to a line of light of constant transverse width at said recording medium in said channels for simultaneously recording said first time-scale record of said signal and said variable density record of said signal in said channel; light measuring means in said channel for measuring the intensity of said light beam; and means for varying said light intensity for a given intensity of said signal.

5. An oscillographic recording apparatus for visually recording a time-varying input signal on a channel of a moving photosensitive recording medium comprising: means for recording a time-scale variable amplitude record of said input signal in said channel; means for forming a time-scale variable density record of said signal in said channel including a galvanometer mirror, said galvanometer mirror being pivotally mounted for oscillation about an axis, means for oscillating said mirror about said axis in response to the intensity of said signal; a light source having substantial and predetermined width uniformly illuminating said mirror and transmitting light to said mirror for reflection thereby, said width being transverse to the direction of movement of said recording medium; a stop aperture positioned between said mirror and said recording medium, said stop aperture being so constructed and arranged as to pass a portion of said light therethrough which portion is dependent upon the angular position of said mirror; means for focusing an image of said mirror substantialy at said medium; means between said aperture and said recording medium for converting said light passed by said aperture substantially to a line of light of constant transverse width at said recording medium in said channel for simultaneously recording said variable density record and said variable amplitude record of said signal in said channel; light measuring means in said channel for measuring the intensity of said light beam; and means for varying said light intensity for a given intensity of said signal.

6. An oscillographic recording apparatus for visually recording a transient input signal on a channel of a moving photosensitive recording medium comprising: means for recording a time-scale variable amplitude record of said input signal in said channel; means for forming a time-scale variable density record of said signal in said channel including a galvanometer mirror, said galvanometer mirror being pivotally mounted for oscillation about an axis, the direction of oscillation being substantially transverse to the direction of movement of said recording medium, means for oscillating said mirror about said axis in response to the intensity of said signal; a light source having substantial and predetermined width for transmitting light to said mirror for reflection thereby, said width being transverse to the direction of movement of said recording medium; a stop aperture positioned between said mirror and said recording medium, said stop aperture being so constructed and arranged as to pass a portion of said light therethrough, which portion is dependent upon the angular position of said mirror; means for focusing an image of said light source substantially at said stop-aperture; means for focusing an image of said mirror substantially at said medium; means between said aperture and said recording medium for converting said light beam passed by said aperture substantially to a line of light of constant transverse width at said recording medium in said channel for simultaneously recording said variable density record and said variable amplitude record of said signal in said channel; light measuring means in said channel for measuring the intensity of said light beam; and means for varying said light intensity for a given intensity of said signal.

7. In an oscillographic recording apparatus for visually recording a transient input signal in one channel of a moving recording medium wherein a light beam is transmitted to said channel from a first mirror which oscillates to vary the position of a light trace perpendicular to the direction of motion of the film record to provide a variable amplitude time scale record of the oscillations of said first mirror, means for recording a variable density time scale record of said signal in said channel comprising: a second galvanometer mirror, pivotally mounted for oscillation about an axis, the direction of oscillation being substantially transverse to the direction of movement of said recording medium, means for oscillating said second mirror about said axis in response to the intensity of said signal; a light source uniformly illuminating said second mirror and transmitting light to said second mirror for reflection thereby, said light source being of predetermined width transverse to the direction of movement of said film; a stop aperture positioned between said second mirror and said film, said stop aperture being so constructed and arranged as to pass a portion of said light therethrough which portion is dependent upon the angular position of said mirror; means for focusing an image of said second mirror substantially at said medium; means between said aperture and said film for converting said light passed by said aperture to a line of light of constant width transverse to said direction of movement of said film at said film for recordation thereon in said channel for simultaneously recording said variable density record and said variable amplitude record of said signal in said channel.

8. In an oscillographic recording apparatus for visually recording a transient input signal in one channel of a moving recording film wherein a light beam is transmitted to the channel from a first mirror which oscillates to vary the position of a light trace perpendicular to the direction of motion of the film record to provide a variable amplitude time scale record of the oscillations of said first mirror, means for recording a variable density time scale record of said signal in said channel comprising: a second galvanometer mirror pivotally mounted for oscillation about an axis, the direction of oscillation being substantially transverse to the direction of movement of said recording medium; means for oscillating said second mirror in response to the intensity of said signal; a light source uniformly illuminating said second mirror and transmitting light to said second mirror, said light source being of predetermined width transverse to the direction of movement of said film; a stop aperture positioned between said second mirror and said film, said stop aperture being so constructed and arranged as to pass a portion of said light therethrough, which portion is dependent upon the angular position of said mirror; means for focusing an image of said light source at said aperture; means for focusing an image of said second mirror substantially at said medium; means between said aperture and said film for converting said light beam passed by said aperture to a line of light of constant width transverse to said direction of movement of said film at said film for recordation thereon in said channel for simultaneously recording said variable density record and said variable amplitude record of said signal in said channel.

9. An oscillograph recording apparatus for visually recording a time-varying input signal on a channel of a moving photosensitive recording medium comprising: means for recording a time-scale variable amplitude record of said input signal in said channel; means for forming a time-scale variable density record of said signal in said channel including a galvanometer mirror, said galvanometer mirror being pivotally mounted for oscillation about an axis, means for oscillating said mirror about said axis in response to the intensity of said signal; a light source having substantial and predetermined width uniformly illuminating said mirror and transmitting light to said mirror for reflection thereby, said width being transverse to the direction of movement of said recording medium; a stop aperture positioned between said mirror and said recording medium, said stop aperture being so constructed and arranged as to pass a portion of said light therethrough which portion is dependent upon the angular position of said mirror; means for focusing an image of said mirror substantially at said medium; means between said aperture and said recording medium for converting said light passed by said aperture substantially to a line of light of constant transverse width at said recording medium in said channel for simultaneously recording said variable density record and said variable amplitude record of said signal in said channel; light measuring means in said channel for measuring the intensity of said light beam; said light measuring means including a photodiode extending into one of said channels, said light within said channel impinging upon said photodiode, associated circuitry and measuring means operatively connected to said photodiode for measuring the light intensity impinged thereon; and means for varying said light intensity for a given intensity of said signal.

10. An apparatus for photographically recording a time-varying signal on a photographic recording medium comprising: means for moving said recording medium in one direction; optical means defining a recording channel on said medium, said channel having length in the direction of motion of said moving medium and having width in the direction transverse thereto; a galvanometer mirror pivotally mounted for oscillation about an axis in the direction substantially transverse to the direction of movement of said medium, means for oscillating said mirror about said axis in response to said signal; a slight source for directing light to said mirror uniformly illuminating an area of constant width on said mirror and transmitting light to said mirror for reflection thereby to said channel; a stop aperture positioned betwen said mirror and said recording medium, said stop aperture being of predetermined width and so constructed and arranged as to pass a portion of said light therethrough, which portion is dependent upon the angular position of said mirror; means defining a point of light incident upon said channel; and means for oscillating said point of light in the direction of the width of said channel in said channel for simultaneously recording a variable density record of said signal with the variable amplitude record of said signal resulting from recordation of said point of light in said channel.

11. An apparatus for photographically recording a time-varying signal on a photographic recording medium comprising: means for moving said recording medium in one direction; optical means defining a recording channel on said medium, said channel having length in the direction of motion of said moving medium and having width in the direction transverse thereto; a galvanometer mirror pivotally mounted for oscillation about an axis in the direction substantialy transverse to the direction of movement of said medium, means for oscillating said mirror about said axis in response to said signal; a light source for directing light to said mirror uniformly illuminating an area of constant width on said mirror and transmitting light to said mirror for reflection thereby to said channel; a channelizer positioned between said mirror and said recording medium, said channelizer being of predetermined width and so constructed and arranged as to pass a portion of said light therethrough, which portion is dependent upon the angular position of said mirror; means defining a point of light incident upon said channel; and means for oscillating said point of light in the direction of the width of said channel in said channel for simultaneously recording a variable density record of said signal with the variable amplitude record of said signal resulting from recordation of said point of light in said channel.

References Cited in the file of this patent

UNITED STATES PATENTS

| | | |
|---|---|---|
| 2,124,473 | Ross | July 19, 1938 |
| 2,312,259 | Maurer | Feb. 23, 1943 |
| 2,420,077 | Hasler et al. | May 6, 1947 |
| 2,426,367 | Maurer | Aug. 26, 1947 |
| 2,769,683 | Skelton | Nov. 6, 1956 |
| 2,821,103 | Blet | Jan. 28, 1958 |
| 2,840,441 | Owen | June 24, 1958 |
| 2,875,017 | Reynolds | Feb. 24, 1959 |
| 2,946,643 | Hutchinson et al. | July 26, 1960 |